(12) United States Patent
Ye et al.

(10) Patent No.: US 6,831,935 B2
(45) Date of Patent: Dec. 14, 2004

(54) MULTISTAGE SYNCHRONIZATION OF PULSED RADIATION SOURCES

(75) Inventors: Jun Ye, Louisville, CO (US); Henry C. Kapteyn, Boulder, CO (US); John L. Hall, Boulder, CO (US); Robert K. Shelton, Stillwater, OK (US); Margaret Murnane, Boulder, CO (US); Long-Sheng Ma, Shanghai (CN)

(73) Assignee: The Regents of the University of Colorado, Boulder, CO (US)

( * ) Notice: Subject to any disclaimer, the term of this patent is extended or adjusted under 35 U.S.C. 154(b) by 14 days.

(21) Appl. No.: 10/109,999

(22) Filed: Mar. 29, 2002

(65) Prior Publication Data

US 2003/0185255 A1 Oct. 2, 2003

Related U.S. Application Data

(60) Provisional application No. 60/279,598, filed on Mar. 29, 2001.

(51) Int. Cl.[7] .............................................. H01S 3/098
(52) U.S. Cl. ........................................... 372/18; 372/9
(58) Field of Search ............................. 372/18–32, 33, 372/34, 38.01, 9, 38.02

(56) References Cited

U.S. PATENT DOCUMENTS

| | | | | |
|---|---|---|---|---|
| 3,869,680 A | * | 3/1975 | Fletcher et al. ................ | 372/18 |
| 4,096,448 A | * | 6/1978 | Hayes ........................... | 372/18 |
| 4,410,273 A | * | 10/1983 | Mantz et al. ................ | 356/319 |
| 4,434,490 A | * | 2/1984 | Kavaya et al. ................ | 372/20 |
| 4,594,511 A | * | 6/1986 | Cooper et al. ......... | 250/339.07 |
| 4,685,111 A | | 8/1987 | Baer ........................... | 372/18 |
| 4,689,795 A | * | 8/1987 | Yoshimoto et al. ........... | 372/31 |
| 4,765,736 A | * | 8/1988 | Gallagher et al. .......... | 356/300 |
| 5,018,151 A | * | 5/1991 | Seaton ........................ | 372/18 |
| 5,367,529 A | * | 11/1994 | Holsinger et al. ............ | 372/30 |
| 5,379,309 A | * | 1/1995 | Logan, Jr. .................... | 372/18 |
| 5,434,877 A | * | 7/1995 | Chung ......................... | 372/32 |
| 5,778,016 A | * | 7/1998 | Sucha et al. ............... | 372/38.1 |
| 6,043,915 A | * | 3/2000 | Giles et al. ................... | 398/94 |
| 6,175,437 B1 | | 1/2001 | Diels et al. ................. | 359/180 |
| 6,185,233 B1 | * | 2/2001 | Moothart et al. ............. | 372/32 |
| 6,192,058 B1 | * | 2/2001 | Abeles ......................... | 372/6 |
| 6,333,966 B1 | | 12/2001 | Schoen ....................... | 378/119 |
| 6,345,058 B1 | | 2/2002 | Hartemann et al. ........... | 372/2 |
| 6,351,309 B1 | * | 2/2002 | Bomse et al. ............... | 356/437 |
| 6,369,926 B1 | * | 4/2002 | Lyu et al. ..................... | 398/95 |
| 6,532,091 B1 | * | 3/2003 | Miyazaki et al. ........... | 398/175 |

* cited by examiner

*Primary Examiner*—Don Wong
*Assistant Examiner*—Tuan N. Nguyen
(74) *Attorney, Agent, or Firm*—Jennifer L. Bales; Macheledt Bales & Heidmiller LLP

(57) ABSTRACT

Accurate and efficient synchronization of two pulsed radiation sources (e.g. two mode locked lasers) is accomplished in stages. Rough synchronization is accomplished by synchronizing (for example) the fundamental repetition rate of the two lasers. Fine synchronization is accomplished by synchronizing high harmonics of the two lasers. More accurate synchronization may be accomplished by adding more stages, by utilizing light out of a nonlinear laser in which the two beams are crossed, or by utilizing heterodyne beats of the two laser beams. A dc offset signal may added to the control signal generated by the synchronization stages.

24 Claims, 8 Drawing Sheets

MULTISTAGE SYNCHRONIZATION OF PULSED RADIATION SOURCES

This application claims priority to the following provisional patent application and incorporates it herein by reference: 60/279,598, filed Mar. 29, 2001.

The present invention was made with government support from the National Science Foundation under Grant PHY-00986822, from NASA under Contract Number NAG5-10368 and from National Institute of Standards and Technology.

BACKGROUND OF THE INVENTION

1. Field of the Invention

The present invention relates to high performance multistage synchronization of pulsed radiation sources.

2. Description of the Prior Art

The ability to synchronize a passively mode locked laser to a reference, or to another laser, has many applications. Conventional methods of synchronizing two mode-locked lasers has accomplished timing jitters of, at best, a few hundred femtoseconds. Since it is now possible to generate pulses with a duration of less than 20 femtoseconds, improved synchronization is desirable, in order to take full advantage of the available time resolution.

Potential applications of improved synchronization of pulsed radiation sources include the generation of hard, bright x-ray beams via inverse Compton scattering, all electronic pump probe scanning, arbitrary repetition rate sum-frequency and difference-frequency generations, and extension of optical frequency comb bandwidth, as well as novel pulse generation and shaping techniques.

FIG. 1 shows two conventional arrangements for the mutual stabilization of two fs or ps mode locked lasers. In the left hand diagram, both lasers are independently locked to a reference oscillator. In the right hand diagram, laser 1 is locked to a reference oscillator and laser 2 is then locked to laser 1. Conventional schemes such as those shown in FIG. 1 typically achieve jitter of, at best, a few hundred femtoseconds.

While many other synchronization techniques for mode locked lasers and the like exist, they all suffer from the same disadvantages. The synchronization cannot be made accurate or efficient enough.

A need remains in the art for more accurate and efficient apparatus and methods for synchronizing mode-locked lasers and the like.

SUMMARY OF THE INVENTION

An object of the present invention is to accurately and efficiently synchronize mode-locked lasers and the like.

This object is accomplished by applying two or more stages of synchronization between the two pulse sources, each stage operating at a higher frequency than the stage before it. In this way the phase difference between the two sources can be quickly and easily acquired (and reacquired after interruptions) with the lower frequency stage, with control then passed to the higher frequency stage(s), which can take over once the two pulse trains are sufficiently synchronized by the first stage.

While a time domain description of the laser output shows an unending series of temporally narrow pulses, these lasers actually can operate under rather stable conditions, with successive pulse delay times and peak powers very much equivalent to the ones just preceding. In this case, a frequency domain description is also valid and quite useful. For example the summation of a long temporal series of equivalent pulses corresponds in the frequency domain to a "picket fence" or "optical comb" of frequencies, spaced rigorously by the inverse of the stable interpulse time interval. Each of the two fs lasers emits such a pulse train, and can be equivalently viewed as generators of optical frequency combs. Because of the strict mathematical relationship between the time and frequency domain descriptions, we can sense and effect temporal control by measuring frequency domain properties. Specifically, if the two lasers are to display the same interpulse time interval, they necessarily will have optical frequency combs with the same frequency separations between the comb lines. To implement a control system, then, it is powerful to make frequency domain measurements of the two separate pulse trains with separate high speed photodetectors. Of course there will be a heterodyne output given by each comb line beating with its two nearest neighbors, yielding a beat frequency matching the repetition rate. Comb lines beating with more distant brothers will lead to higher harmonic frequencies of the basic fundamental repetition rate.

This lowest frequency is used for the rough tuning control loop, because it has the largest unambiguous temporal range. Multi-frequency outputs of optical detectors coupled to the two lasers are filtered by pass-filters for their output at the fundamental frequency, for example 100 MHz. One of these channels passes through an adjustable rf phase delay before joining its partner in a balanced mixer, which functions as a phase detector, giving an output voltage dependent upon the relative phase of the two rf signals. A suitable controller converts this error output into a correction signal which is sent to one of the lasers to effect a stable phase lock, and thus accomplish a temporal domain synchronization of the optical pulse trains emitted by the two independent lasers.

Apparatus for synchronizing the repetition rates of two pulse radiation sources comprises a device for controlling the repetition rate and hence the timing of a designated one of the sources with respect to the other source in response to a control signal, a first synchronization stage for roughly synchronizing the two sources, by generating a rough feedback signal comprising the control signal, and a second synchronization stage for finely synchronizing the two sources, by generating a fine feedback signal comprising the control signal.

A repetition rate control device initially provides the rough feedback signal as the control signal to the designated source, and then gradually shifts to provide the fine feedback signal as the control signal to the designated source. For example, the sources may mode-locked lasers. In one embodiment, the lasers are Ti:Sapphire lasers, and the jitter between the two lasers is reduced to less than 15 femtoseconds.

If the lasers have a common repetition rate, the first synchronization stage generally synchronizes the fundamental frequency of the common repetition rate and the second synchronization stage synchronizes a harmonic of the common repetition rate. If the lasers have different repetition rates, the first synchronization stage synchronizes lower harmonics of the repetition rates and the second synchronization stage synchronizes higher harmonics of the repetition rates.

A third synchronization stage may be provided for extrafinely synchronizing the two sources, by generating an extra-fine feedback signal comprising the control signal. The extra-fine feedback signal might be based upon a combination of the laser beams within a nonlinear device. Or, the extra-fine feedback signal could be based upon a heterodyne beat of the laser beams.

DETAILED DESCRIPTION OF THE PREFERRED EMBODIMENT

Figure 1:
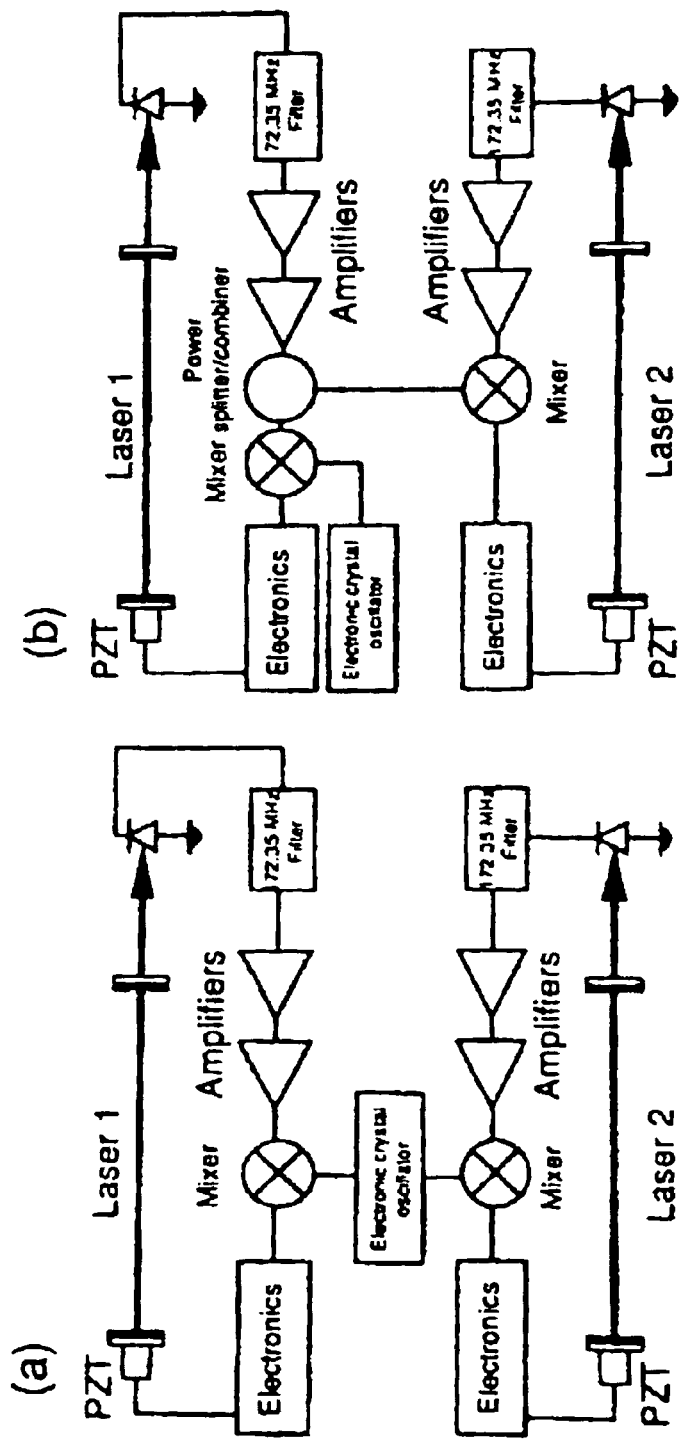
FIG. 1 (Prior Art) is a block diagram showing a conventional mode-locked laser synchronization scheme.
Figure 2:
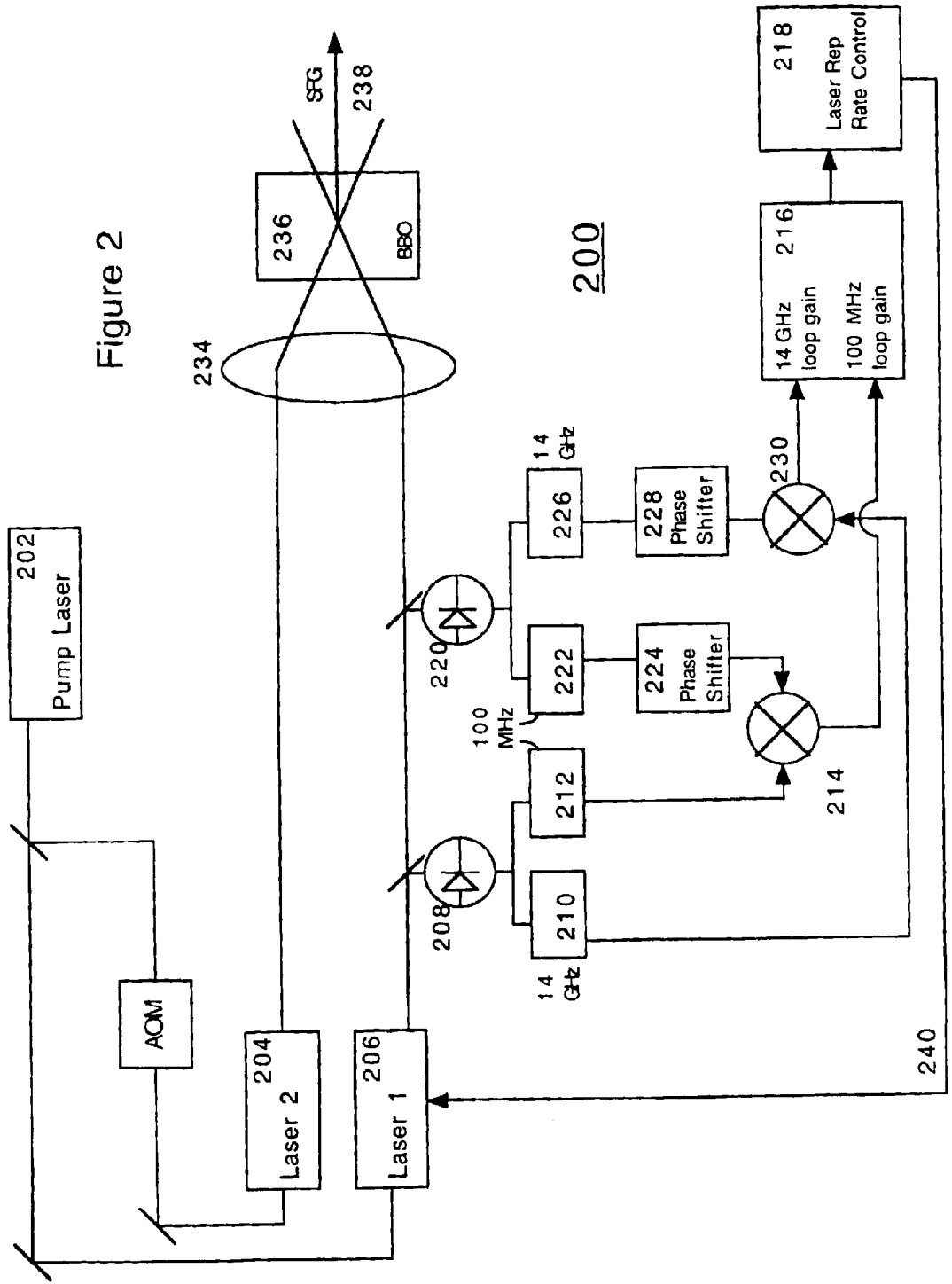
FIG. 2 is a block diagram showing a first embodiment of a multistage mode-locked laser synchronization scheme according to the present invention.

FIG. 2 is a block diagram showing a first embodiment of a multistage mode-locked laser synchronization system 200 according to the present invention. The synchronizing apparatus of FIG. 2 includes a common pump laser 202 as an energy source for Laser 1 (204) and Laser 2 (206) to operate in the stable self-mode-locked regime. In addition, an acoustooptic modulator may be placed in either or both laser 204 or 206's pump beam to improve fast noise, or temporal jitter. In use, the repetition rate of lasers 204 and 206 are roughly synchronized to start with by mechanically adjusting the optical cavity lengths to be equal. Control signal 240 will be applied to laser 206 to lock it to laser 204, which is free running.

A portion of the light from laser 206 is transmitted to photo-diode 208, and a portion of the light from laser 204 is transmitted to photo-diode 220. The voltage signals from these two photo detectors 208, 220 are used in the rough tuning, or broad-range, phase-locked loop (PLL) and the fine tuning PLL as follows.

The rough tuning PLL synchronizes the two lasers 204, 206 using rf signals at a relatively low frequency derived from the photo-diode signals, for example the fundamental frequency of their common repetition rates (e.g. 100 MHz). The rough tuning PLL comprises filters 212 and 222, phase shifter 224, and balanced mixer 214. Filters 212, 222, filter for the low frequency, 100 MHz signal from the photo diodes. Phase shifter 244 (preferably a variable shifter) applies a phase shift to one of the 100 MHz signals, in this example the signal out of filter 222. Returning to the frequency-temporal Fourier duality, it can be seen that an adjustment of the rf phase between detector 220 and mixer 214 will cause the lasers to be locked with a changed phase difference between their comb lines. Phase shifter 244 is employed to assure that when the locking circuit is active, the relative timing of the two laser output pulses is at the approximate desired value. For example, often the pulses from the two lasers will be incident into a single experimental setup nearly simultaneously.

Figure 4:
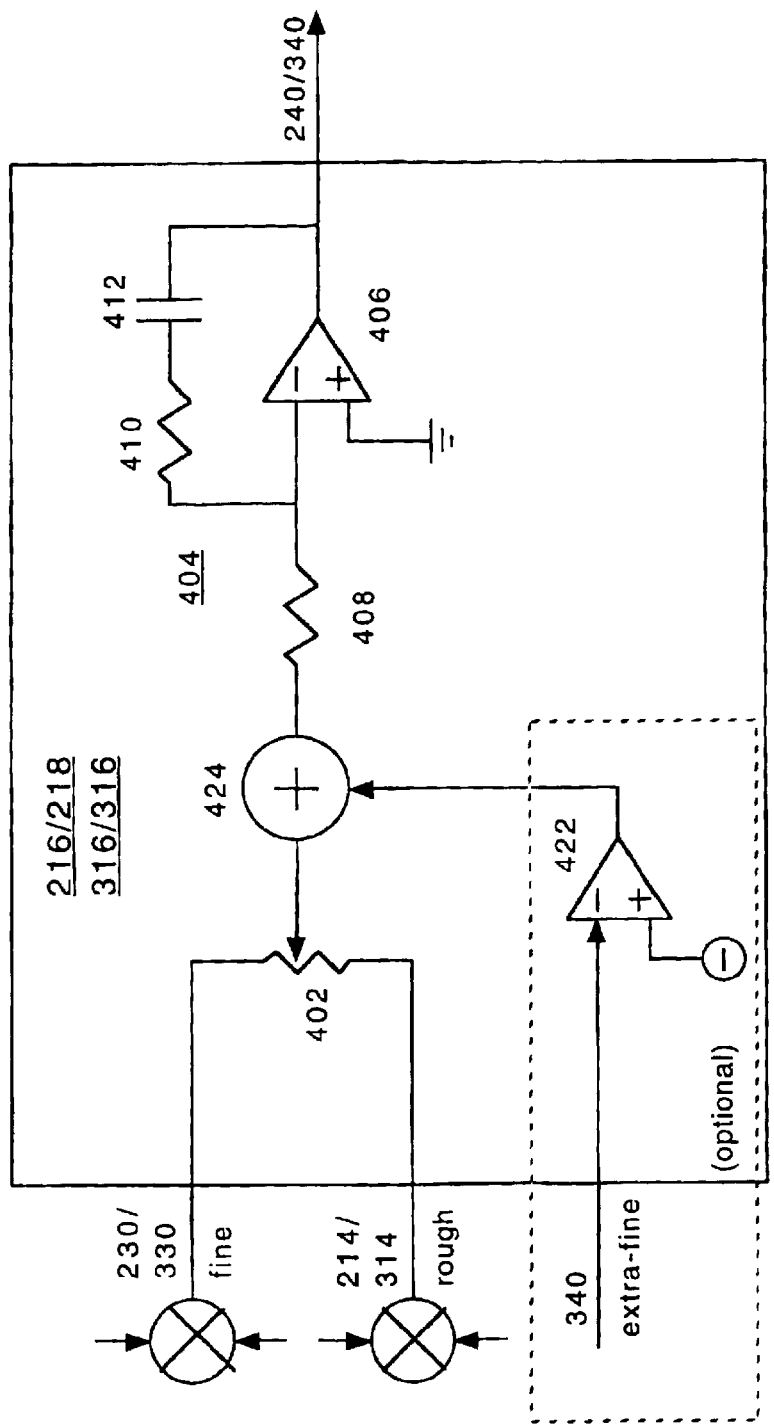
FIG. 4 is a is a block diagram showing apparatus for computing feedback to one of the lasers of FIG. 2 or 3.

Balanced mixer 214 compares the two 100 MHz signals to generate the low frequency error signal, which is then provided to control signal generator block 218, shown in more detail in FIG. 4.

Meanwhile, the fine tuning PLL synchronizes the two lasers 204, 206 at a relatively high PLL operating frequency, for example (shown here) the 140th harmonic of their common repetition rate (e.g. 14 GHz). The fine tuning PLL comprises filters 210 and 226, phase shifter 228, and balanced mixer 230. Filters 210, 226, are pass-filters for the high frequency, 14 GHz comb lines from the photodiode signal. Phase shifter 228 applies a phase shift to one of the 14 GHz signals, in this example the signal out of filter 226, to obtain the approximate desired relative timing of the pulse trains.

Balanced mixer 230 compares the two 14 GHz signals to generate the high frequency error signal, which is then provided to control signal generator block 218. Control signal generator block 218 provides control signal 240 to synchronize laser 206 with free running laser 204. Initially, block 218 provides the 100 MHz control signal in order to roughly synchronize the lasers. Once they are adequately synchronized to the resolution of the lower frequency channel, control is smoothly transferred and block 218 shifts into providing the 14 GHz control signal, accomplishing the fine synchronization. Thus, "tight" synchronization of the two lasers is (at least) a two step process: an initial rough synchronization step that locks the two sources to the desired relative timing, but with relatively high jitter; followed by a continuous transition to a high frequency fine or "tight" synchronization step that achieves and maintains accurate relative timing.

The initial synchronization step might be accomplished in a number of different ways. For example, inducing a slight offset in the relative frequencies of the two lasers would cause a continuous "sweep" of the relative timing, and a transition to the fine synchronization stage then occurs at the right time during the sweep: when the two pulse trains are sufficiently synchronized. In any case, the result of the multistage synchronization process is synchronization of the two sources at the desired relative timing. The fine synchronization step would not be able to achieve this result on its own, because the high frequency PLL operates at a harmonic of the repetition rate and hence has a limited temporal range.

FIG. 4 illustrates a method by which the time jitter between the two lasers may be measured and even more finely tuned using a subsequent synchronization stage. A control signal is developed from output optical signal 238, generated by supplying the two laser signals into nonlinear element 236, thereby generating a signal 238 related to how closely the two beams are synchronized. In one preferred embodiment, the two laser signals are crossed at angle within a nonlinear crystal 236, as shown in FIG. 2.

An example of a synchronization device according to the embodiment of FIG. 2 is described below. The two lasers 204, 206 are low-threshold Kerr-lens mode-locked Ti:sapphire lasers that each produce a mode-locked average power of more than 300 mW with 2.5 W pump power at 532 nm. Both are located on a temperature controlled, 5 cm thick, solid aluminum base plate, which is decoupled from the table vibration noise by a set of supporting feet made of rubber. Lead plates are tightly bonded to the bottom side of the base plate, positioned asymmetrically to damp the plate's vibrational modes. The vibration noise measured on top of the base plate is generally reduced by 10 dB or more within the frequency range of 100 Hz to 6 kHz, compared with the noise on the optical table. A 5 W pump laser 202 is split to provide the two pump beams. It is worth noting that having a single source pump for the two lasers does not mean the pump beams are no longer a source of timing jitter. The pump couples into each laser differently, and the pump beam takes a differential path to get to the two lasers, and thus picks up differential noise.

The beam height inside the laser cavities is only 6 cm above the base plate, which should enhance stability because of the reduced vibrational lever-arm of the optical mounts. To achieve the lowest possible timing jitter it is critical to enclose both lasers and their pump beams so as to shield them from blowing dust and convection air currents.

As described above, synchronization is accomplished with two phase locked loops (PLL) working at different timing resolutions. One PLL compares and locks the fundamental repetition frequencies (100 MHz) of the two lasers. The phase shift between the two 100 MHz signals can be used to control the (coarse) timing offset between the two pulse trains with a full dynamic range of 5 (=10÷2) ns. The second, high-resolution PLL compares the phase of the 140th harmonic of the two repetition frequencies; i.e., at 14 GHz. This second loop provides enhanced phase stability of the repetition frequency when it supplements and then replaces the first PLL. A transition of control from the first PLL to the second PLL can cause a jump in the timing offset by at most 35.71 ps (½ of one 14 GHz cycle), whereas the adjustable range of the 14 GHz phase shifter is 167 ps. The servo action on laser 206 is carried out by a combination of transducers, including a fast-piezo-actuated small mirror (4 mm in diameter and 2.5 mm thick), a regular mirror mounted on a slow piezo with a large dynamic range (~180 Hz/100 MHz), and an acousto-optic modulator placed in laser 206's pump beam to help with the fast noise. The unity gain frequency of the servo loop is about 200 kHz and the loop employs three integrator stages at the low frequency region.

The two pulse trains are focussed by optics 234 so that they cross in a thin BBO crystal 236 cut for sum frequency generation (Type-I SFG). The crossed-beam geometry produces a non-fringe resolved SFG cross-correlation signal. The Gaussian cross-correlation peak (obtained when the two lasers are free-running) is about 161 fs FWHM. (No extra-cavity dispersion compensation is used, so the would-be 20-fs laser pulses are broadened.) The time axis of the cross-correlation is calibrated by measuring the difference between the two laser repetition rates when the cross-correlation is recorded. The calibrated slope of the cross-correlation signal near the middle height can be used to determine the relative timing jitter between the two lasers from the corresponding intensity fluctuations. The intensity fluctuations of the SFG signal may be recorded over a period of several seconds using two different low pass bandwidths, 160 Hz and 2 MHz, which suppress the pulsed nature (100 MHz) of the SFG signal amplitude and permit the study of intensity noise on a cw basis.

Figure 3:
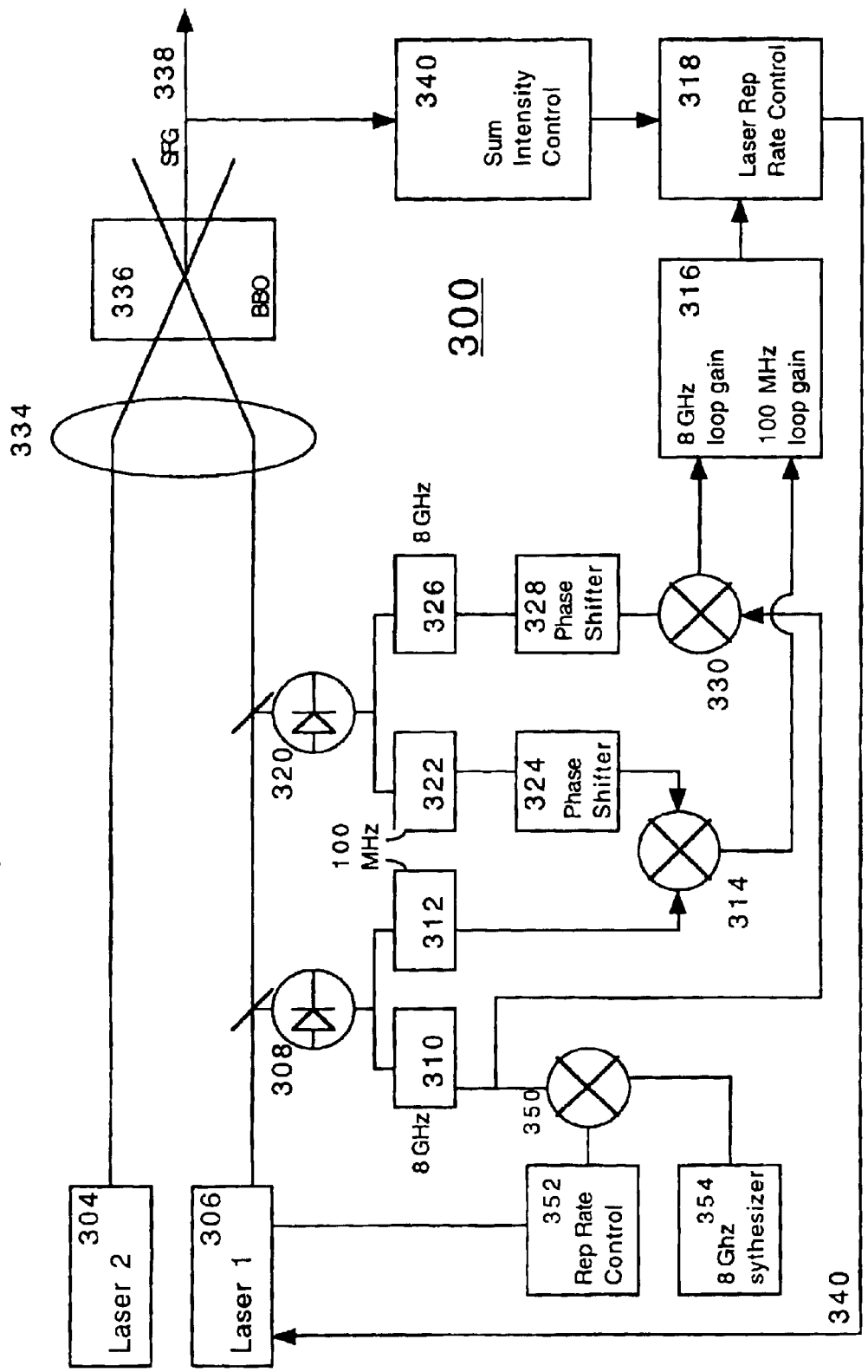
FIG. 3 is a block diagram showing a second embodiment of a multistage mode-locked laser synchronization scheme according to the present invention.

FIG. 3 is a block diagram showing a second embodiment of a multistage mode-locked laser synchronization device 300 according to the present invention. Synchronization device 300 is similar to synchronization device 200 of FIG. 2, and similar elements share similar reference numbers. The most important difference between device 200 and device 300 is that lasers 304 and 306 are not controlled by a common pump laser 202, which is convenient in some circumstances. Also, for example, laser 304 and 306 may have different repetition rates.

Laser 304 is synchronized to laser 306 in this example. The repetition rate of laser 306 may be free running or may be synchronized to a stable RF source 354. Then, laser 304 is synchronized to laser 306 in stages, first by a low rate PLL and then by a high rate PLL, in a manner similar to that discussed in conjunction with FIG. 2.

The repetition rate of laser 306 is synchronized to stable RF source 354 as follows. A portion of the beam from laser 306 is routed to photodetector 308. Filter 310 accepts a high frequency harmonic, or component of the beat comb (e.g. 8 GHz). Balanced mixer 350 compares the output of filter 310 to the 8 GHz signal from RF source 354. The error signal is provided to repetition rate control block 352, which synchronizes the repetition rate (e.g. 100 MHz) of laser 306 to the rf standard according to the error signal.

The rough tuning PLL synchronizes the two lasers 304, 306 at a relatively low frequency, for example the fundamental frequency of one of their repetition rates (e.g. 100 MHz). The rough tuning PLL comprises filters 312 and 322, phase shifter 324, and balanced mixer 314. Filters 312, 322, filter for the low frequency, 100 MHz comb line. Phase shifter 344 applies a phase shift to one of the 100 MHz signals, in this example the signal out of filter 322, to control the temporal relation between the two pulse trains.

Balanced mixer 314 compares the two 100 MHz signals to generate the low frequency error signal, which is then provided to control signal generator block 318, an example of which is shown in FIG. 4.

The fine tuning PLL synchronizes the two lasers 304, 306 at a relatively high frequency, for example the 80th harmonic of their repetition rate (e.g. 8 GHz). This frequency could be any other suitable harmonic of the repetition frequency. The fine tuning PLL comprises filters 310 and 326, phase shifter 328, and balanced mixer 330. Filters 310, 326, filter for the high frequency, 8 GHz comb line. Phase shifter 328 applies a phase shift to one of the 8 GHz signals, in this example the signal out of filter 326.

Balanced mixer 330 compares the two 8 GHz signals to generate the high frequency error signal, which is then provided to control signal generator block 318. Control signal generator block 318 provides control signal 340 to synchronize laser 304 with laser 306. Initially, block 318 provides the 100 MHz control signal in order to roughly synchronize the lasers. Once they are roughly synchronized, block gradually shifts into providing the 8 GHz control signal, accomplishing the fine synchronization. FIG. 4 illustrates a method by which the lasers may be even more finely tuned, by developing a control signal from output optical signal 338, generated by crossing the two laser signals in nonlinear block 336, thereby generating a control signal 340 related to how closely the two beams are synchronized.

Many other variations of the systems described above are possible. For example, both lasers could be synchronized to the 8 GHz synthesizer 354, simply by shifting one of the inputs of mixer 330 from the output of filter 310 to the output of synthesizer 354. The result would be substantially the same, since the two lasers each synchronized to the same reference will also be synchronized to each other. Other possible variations include the use of separate photodetectors for the high-frequency and low-frequency synchronization.

An example of a synchronization device according to the embodiment of FIG. 3 is described below. Laser 304 is a mode-locked Ti:sapphire laser running at 780 nm, and laser 306 is a mode-locked Ti:sapphire laser running at 820 nm. Both are running at a repetition rate of around 100 MHz. The first PLL roughly synchronizes laser 304 to laser 306 by synchronizing the common repetition rate of the two lasers.

The second PLL finely synchronizes laser 304 to laser 306 by synchronizing the 80th harmonic of the repetition rate of the two lasers, i.e. at 8 GHz. Using the variable control shown in FIG. 4 (or an equivalent, such as controllable resistors), the first PLL hands off control to the second PLL as laser 304 is roughly synchronized to laser 306. Then the second PLL finely synchronizes the lasers.

The control signals 340 out of repetition rate control block 318 actuate a fast (>10 KHz bandwidth) piezo-transducer holding an end mirror of laser 304. The two pulse trains are focused by optics 334 to cross within nonlinear crystal 336. The intensity fluctuations in the generated sum-frequency light are proportional to to the timing jitter, particularly when the two pulses are offset in time by about ½ of the pulse width. Hence, the SFG output 338 of crystal 336 may be detected and used as an input 340 to a third synchronization stage. See FIG. 4.

Synchronization device 300 may also be used to synchronize two lasers operating at different repetition rates. Each PLL then synchronizes different harmonics of the two repetition rates, which result in the same frequencies in pairs filtered by filters 312 and 322, and by 310 and 326. For example, The first PLL might synchronize the 9th harmonic of laser 304 to the 10th harmonic of laser 306, and the second PLL might synchronize the 81st harmonic of laser 304 to the 90th harmonic of laser 306.

FIG. 4 is a block diagram showing an example of apparatus for computing feedback control signals to one of the lasers of FIG. 2 or 3. It also shows the optional addition of a third control signal 340 derived from the detected output of nonlinear crystal 236/336. Laser repetition rate control block 218/318 includes a variable resistor 402, which selects how much of the rough synchronization error signal and how much of the fine synchronization control signal is provided to the laser to be controlled (206 or 304). When synchronization begins, all of the error signal from the rough (broad-range) synchronization is provided, and none of the error signal from the fine synchronization. Once the controlled laser is adequately synchronized to the free running laser (204 or 306), block 218/318 gradually lowers the amount of rough synchronization control signal that is provided and increases the amount of fine synchronization control signal, until only the fine synchronization control signal is provided, accomplishing the fine synchronization stage. Alternative methods for making the transition from the rough synchronization to the fine synchronization include the use of voltage adders and variable gain amplifiers and the like.

Circuitry 404 includes an op-amp 406, resistors 408 and 410, and capacitor 412. Circuitry 404 amplifies, filters, and conditions the error signal to appropriately drive the piezoelectric and acoustooptic actuators that control laser timing and repetition rate. Capacitor 412 effectively integrates the low frequency error input components to produce a more stringent lock at low frequencies. This combination forms a Proportional-Integral (PI) servosystem controller.

If a third, extra-fine synchronization PLL is used, the signal from crystal 236/336 is detected by a photo detector 238/338 and fed into an op-amp 422 which amplifies the variations in the output of SFG-detector 238/338 and filters and conditions this error signal. The extra-fine control signal represents timing jitter and is added to the coarse and fine control signals, again with variable relative gain. The sum 424 is provided to the controlled laser.

Figure 5:
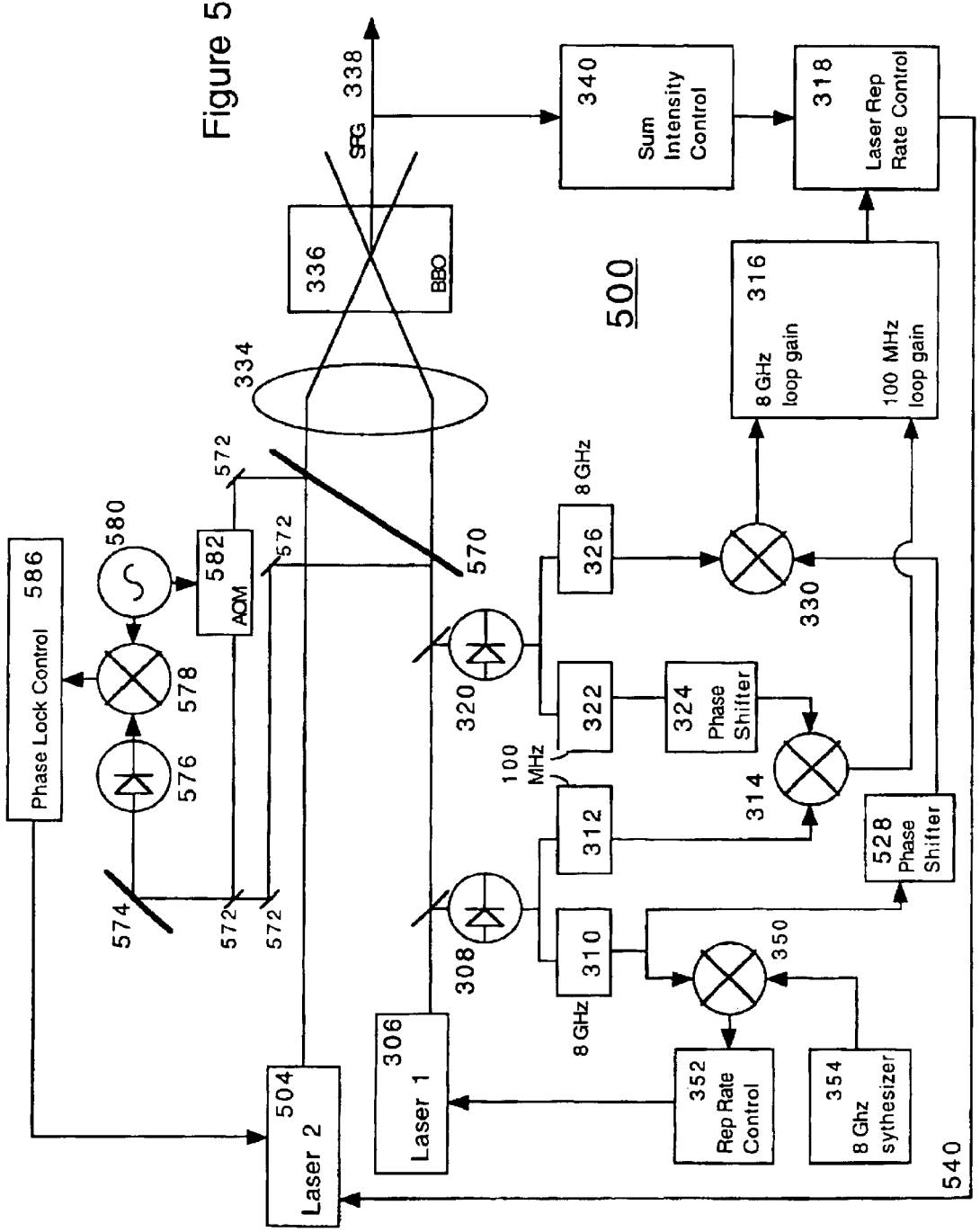
FIG. 5 is a block diagram showing a third embodiment of a multistage mode-locked laser synchronization scheme according to the present invention.

FIG. 5 is a block diagram showing a third embodiment of a multistage mode-locked laser synchronization scheme 500 according to the present invention. This system includes the rough tuning and fine tuning stages described in systems 200 and 300 of FIGS. 2 and 3. These stages will not be described again.

Once synchronization device 500 has laser 306 well synchronized to reference clock 354 and laser 504, an additional synchronization signal is developed and an extra synchronization stage is accomplished.

This achieves the important objective of displacing the entire optical frequency comb of laser 504 so these comb lines will be perfectly aligned with the comb lines emitted by laser 306. The locking methods of 200 and 300 establish that the pulse repetition rate of the two lasers are strictly equal, which ensures that the two optical comb systems have exactly the same spacing between their "teeth." However the location of the entire comb line system is not specified by systems 200/300. This variable frequency offset between the two combs prevents some interesting applications of the dual laser configuration, and it is removal of this variability that is additionally accomplished by system 500, beyond the function of precise synchronization provided by 200/300. To measure the optical frequency difference between the two lasers it is convenient, by using Acousto-Optic Modulator 582, to frequency-shift each of optical frequency components of laser 504 by the same amount, namely the frequency provided by rf source 580. After AOM 582, beams from both lasers are physically overlapped and combined into a single direction by mirrors 572. Grating 574 serves the purpose of selecting for measurement only those optical frequencies that are spectrally overlapping in the outputs of lasers 306 and 504. Photodetector 576 converts this optical signal to an electrical signal. Because of the frequency offset introduced by AOM 582, if the two combs from the lasers would have just the same frequency values in the spectral region where they overlap, the output of detector 576 would contain a strong signal at the AOM's drive frequency as provided by source 580. The variations of the heterodyne beat from this value contain the needed information for implementing a phase locking of the two independently generated optical combs. Accordingly, the heterodyne beat between the two corresponding sets of combs is extracted by balanced mixer 578 whose output voltage is a direct measure of the difference in optical phase between corresponding comb line components from the two lasers. This heterodyne error signal is then processed and is applied to laser 504 to control the optical frequency by shifting the entire comb (in addition to the other error signals from the other synchronization stages which control the common frequency interval between the comb lines).

The result is that the pulsed output of the two lasers is synchronized, not only in the timing of the pulse envelope, but also in the the relative timing of the oscillations of the optical frequency light field itself. The two light sources are now "phase coherent" and the light from these lasers can in fact be combined to appear as if the light is generated from a single, coherent source.

Figure 8:
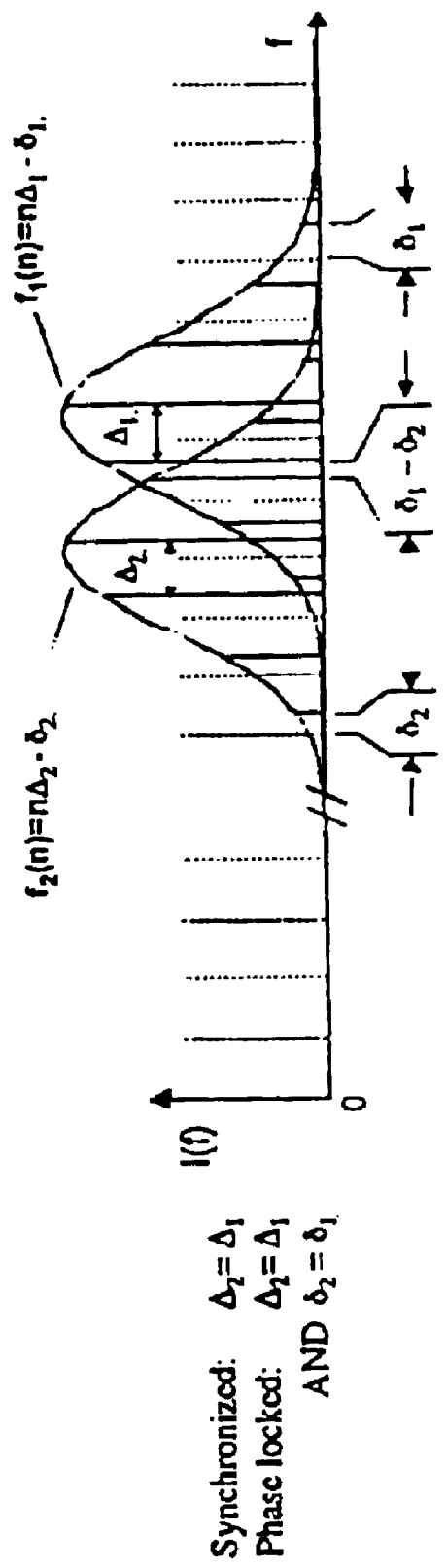
FIG. 8 is a plot illustrating the phase locking of FIG. 5.

FIG. 8 illustrates how the phase locking of FIG. 5 is accomplished. In order to phase lock the optical carrier frequencies of the two lasers, it is necessary to ensure that the spectral combs of the individual lasers are exactly coincident in the region where the spectra of the two lasers overlap. This requires both that the spacing of the frequency modes be equal for both lasers, and that the absolute positions of these modes are locked to be coincident. This requirement is also associated with the rate of slipping of the carrier-envelope phase of these short pulses. The difference in the group ($v_g$) and phase ($v_p$) velocities ($v_p \neq v_g$) results in a pulse envelope function that is not fixed with respect to the underlying optical oscillation frequencies—in general there is a phase slip between the "carrier" phase and the envelope peak for each of the successive pulses emitted by the laser. Denoting this pulse-to-pulse phase slip by Δϕ, each optical comb frequency will be given by $f_n = nf_{rep} + \delta$. This corresponds to $\delta = f_{rep} (\Delta\phi/2\pi)$, where n is the integer harmonic number (~4×10$^6$) of the optical mode frequency relative to $f_{rep}$. Synchronizing the two lasers using the apparatus of FIG. 5 makes $f_{rep}$ identical for both lasers. However, while the comb lines are rigorously equally spaced in frequency, Δϕ can still differ between the two lasers. This corresponds to the situation where the overall "envelope" of the pulses emitted by the two lasers are synchronized, but the individual oscillations of the electromagnetic field are not yet synchronized.

To achieve phase locking under synchronization, we also need to match the two sets of optical frequency combs so that they form a continuous and phased set. To achieve this, the two lasers should exhibit a certain degree of spectral overlap (bottom diagram), allowing detection of a coherent heterodyne beat signal between the corresponding comb components of the two lasers. Such heterodyne detection yields information related to $(\delta_1 - \delta_2)$, which can then be controlled. By phase locking $(\Delta\phi_1 - \Delta\phi_2)$ to a frequency of a mean zero value, we effectively demand that $(\Delta\phi_1 - \Delta\phi_2) = 0$, leading to two pulses trains that have nearly identical dynamical evolution.

The comb can be characterized by two variables; $f_{rep} = v_g/l_c$ and $\delta = v_0 (1 - v_g/v_p)$, where $v_0$ is the laser carrier frequency and $l_c$ the cavity length. One obvious choice of laboratory control variables is the cavity length $l_c$, which controls $f_{rep}$ without any influence on δ. Another control mechanism would be to vary either the pump laser power, which influences both $v_g$ and $v_p$, or to vary the angle of a swivel mirror in the dispersed end of the laser cavity to control $v_g$. In the preferred embodiment a fast servo loop is used to acting on $l_c$ to stabilize $f_{rep}$ while the offset frequency δ is controlled using the swivel mirror. Fluctuations of δ appear to develop on a slower time scale compared with that of $f_{rep}$ and therefore a correspondingly slower servo loop is sufficient for stabilization of δ.

The two independent mode-locked Ti:Sapphire lasers each operate at a 100 MHz repetition rate, with one centered at 760 nm and the other at 810 nm. The synchronization scheme employs the multistage synchronization scheme described above (see FIGS. 2 and 3) with two phase locked loops (PLL) working at different time resolutions. The first loop operates at the fundamental repetition frequency to provide full dynamic range of timing offset, while the second one operates at the 80th harmonic of $f_{rep}$ (8 GHz) to provide enhanced phase stability. Using this approach we have demonstrated the timing jitter between the two separate pulse trains to be <5 fs, at a bandwidth of 160 Hz, observed over several minutes. The present invention can also lock two independent lasers working at different commensurable repetition frequencies.

When the two lasers are well-synchronized, the heterodyne beat between the two corresponding sets of combs can be recovered with a signal-to-noise ratio (SNR) of 60 dB in a 100 kHz bandwidth. Phase shift in the synchronization lock loop is adjusted to have the two pulses optimally overlapped temporally at the heterodyne detector to produce the maximum beat signal. The beat detection effectively measures the difference $(\delta_1 - \delta_2)$ in the carrier-envelope offset frequency δ between the two fs combs. Hundreds of comb pairs contribute to the heterodyne beat signal, and its amplitude is coherently enhanced when the synchronization is effective. By stabilizing $(\delta_1 - \delta_2)$ to a mean value of zero Hertz, the carrier-envelope phase slip per pulse of one laser will be accurately matched by the second laser. Locking of this beat frequency to zero Hz is implemented using an acoustooptic modulator (AOM). One laser beam passes through the AOM and is offset by the drive frequency of the AOM. This avoids the need to process the beat signal in the troublesome frequency range around zero frequency. The beat is then phase locked to the drive frequency of the AOM, effectively removing the AOM frequency from the beat.

One specific example of a synchronization device according to the embodiment of FIG. 5 is described below. The bulk of device 500 is identical to device 300 of FIG. 3. Identical reference numbers indicate equivalent elements, and like reference numbers indicate like elements.

The third, heterodyne synchronization stage comprises beam splitter(s) 570, mirrors 572, grating 574, detector 576 (e.g. New Focus 1801-FS), balanced mixer 578, AOM 582 (e.g. Isomet 1205C-2-804B) with drive frequency source 580, optical delay 584, optical phase lock controller 586, and heterodyne feedback control signal 588. Beam splitter 570 and mirrors 572 direct a portion of each laser beam to grating 574, where the beams are physically combined, resulting in heterodyne beat signals. The heterodyne beat between the two beams can be recovered with signal to noise ratio (SNR) of 60 dB in a 100 KHz bandwidth. For best performance, the electrical phase shift applied by phase shifter 528 may be adjusted to optimize the temporal pulse overlap at detector 576 (See FIGS. 2 and 3 and associated text).

The beat detection effectively measures the difference $(\delta_1 - \delta_2)$ to a mean value of 0 Hz in the carrier envelope offset frequency δ between the two frequency combs. Hundreds of comb pairs contribute to the heterodyne beat signal, and its amplitude is coherently enhanced when the synchronization is effective.

By stabilizing $(\delta_1 - \delta_2)$ to a mean value of 0 Hz, the carrier-envelope phase slip per pulse of one laser will be accurately matched by the second laser. Locking of this beat frequency to to 0 Hz may be conveniently implemented with acousto-optic modulator (AOM) 582. AOM 582 is angle-optimized so that the first order diffracted mode has maximum power. One laser beam passes through AOM 582, picking up the AOM's frequency offset. The interesting frequency range at photodetector 576's output is thus centered around the frequency of rf source 580, and is selected by a filter and amplifier before mixer 578. In this way, one avoids the need to process the beat signal in the troublesome frequency range around dc. The beat is then phase locked to the AOM's drive frequency from source 580, effectively removing the AOM frequency from the beat. The phase locking of the two optical combs is implemented by passing the output of mixer 578 through a low pass filter (~100 KHz) into a phase lock servo filter/amplifier 586. The resultant error signal is used to control the swivel mirror of laser 504 via a low voltage PZT driver.

After the heterodyne synchronizing stage, neither laser has its carrier/envelope offset phase stabilized, but the two lasers have the same dynamic carrier-envelope phase evolution. The output of the two lasers, after beam combination via mirrors 570, 572 and time delay 584 now show a common repetition frequency and therefore frequency interval between comb lines, as discussed in conjunction with FIGS. 2 and 3. But additionally, now the two comb line systems are in alignment and merge seamlessly in the crossover region where they spectrally overlap. Thus, the output pulse has broader bandwidth and hence potentially higher peak power and shorter duration than either of the source lasers.

Figure 6:
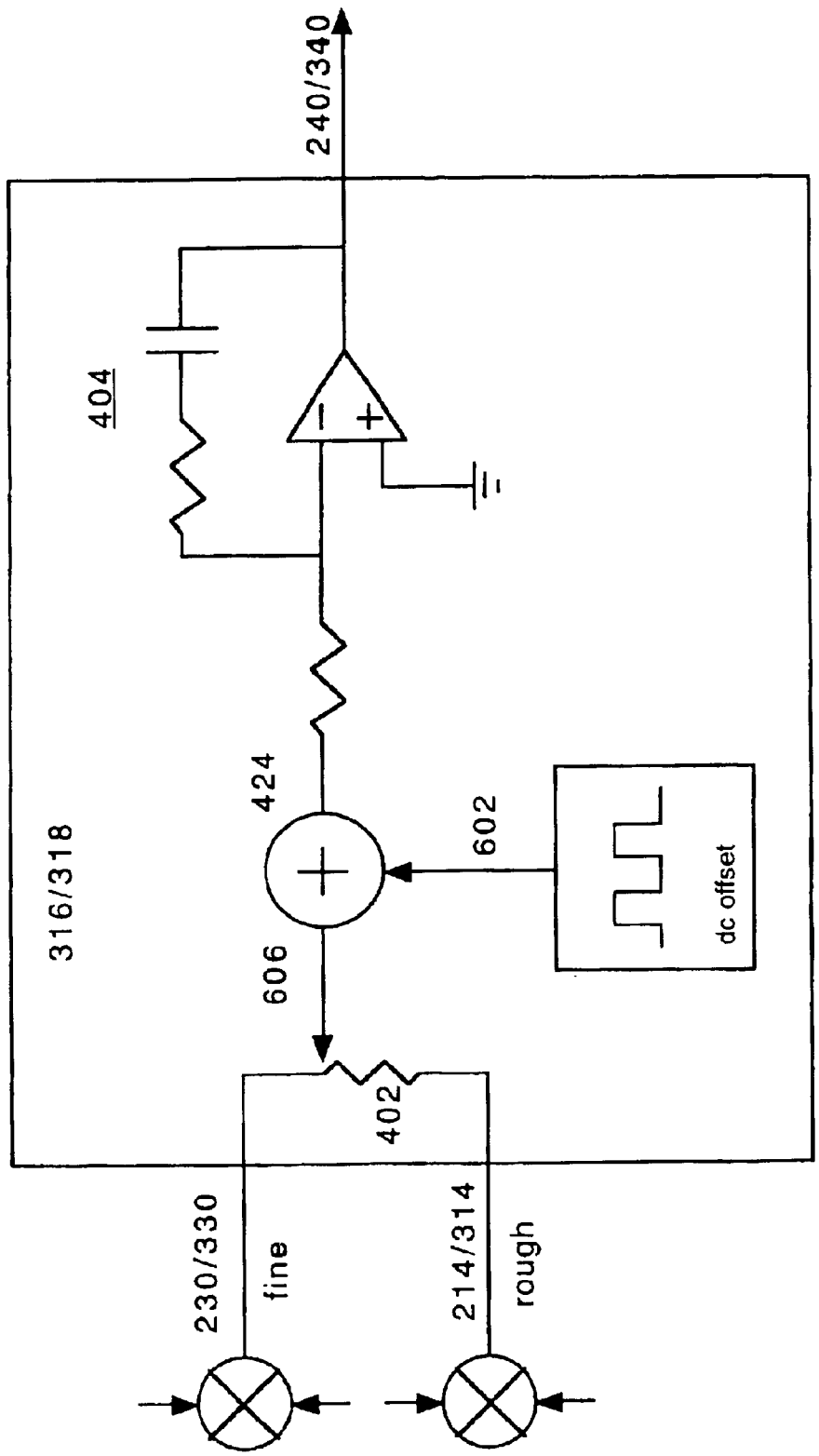
FIG. 6 is a block diagram showing apparatus for applying a dc offset to the feedback control signal applied to one of the lasers of FIG. 2, 3, or 5.
Figure 7:
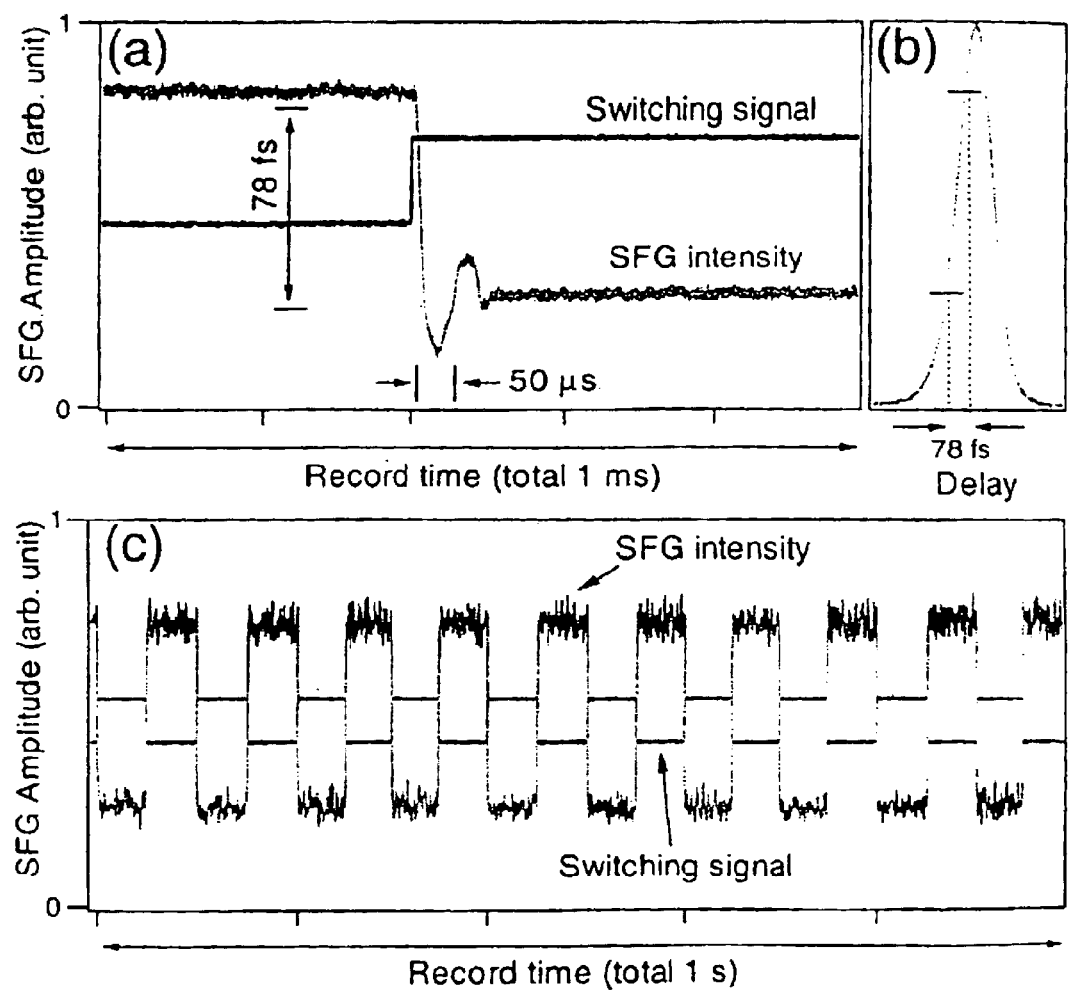
FIG. 7 is a timing diagram showing the output signal achieved with the use of a square wave dc offset in FIG. 6.

A method for electrically programming the time delay between the two independent sources is shown in FIG. 6, which is a block diagram showing apparatus for applying a dc offset 602 to the feedback control signal 240/340 applied to one of the lasers of FIG. 2, 3, or 5. This dc offset is used to generate a desired pattern of small time delay levels, which may be detected and confirmed by a correspondingly shaped output power from crystal 236/336. Dc offset 602 is applied and operational only after the two lasers have been roughly and finely synchronized, so laser repetition rate control block 218/318 is providing only the fine synchronization error signal, which is now to be modified. This dc offset is used to generate a programmable phase step in the electrical side which results in a corresponding time-domain offset. This results in a time domain step in the output beam from crystal 236/336. In the example of FIG. 6, dc offset 602 is a square wave. FIG. 7 shows the output optical SFG signal resulting from such a square wave.

Adder 424 combines fine control signal 606 and dc offset 602. Circuitry 404 is basically the same as the circuitry shown in FIG. 4.

FIG. 7 is a timing diagram showing the output signal achieved with the use of a square wave dc offset in FIG. 6. The top diagram indicates one transition of the switching signal from low to high, and the corresponding change in the optical output intensity which speaks for the time domain pattern imposed. The lower diagram shows on a longer time scale a series of square wave switching signals and the corresponding output intensity.

While the exemplary preferred embodiments of the present invention are described herein with particularity, those skilled in the art will appreciate various changes, additions, and applications other than those specifically mentioned, which are within the spirit of this invention.

What is claimed is:

1. Apparatus for synchronizing the repetition rates of two pulse radiation sources comprising:

means for controlling the repetition rate and hence the timing of a designated one of the sources with respect to the other source in response to a control signal;

a first synchronization stage for roughly synchronizing the two sources, by generating a rough feedback signal comprising the control signal; and a second synchronization stage for finely synchronizing the two sources, by generating a fine feedback signal comprising the control signal.

2. The apparatus of claim 1, further including a repetition rate control device for initially providing the rough feedback signal as the control signal to the designated source, and then for gradually shifting to provide the fine feedback signal as the control signal to the designated source.

3. The apparatus of claim 2 wherein the sources are mode-locked lasers.

4. The apparatus of claim 3, wherein the lasers are Ti:Sapphire lasers, and wherein the jitter between the two lasers is reduced to less than 15 femtoseconds.

5. The apparatus of claim 4, wherein the lasers have a common repetition rate.

6. The apparatus of claim 5 wherein the first synchronization stage synchronizes the fundamental frequency of the common repetition rate and wherein the second synchronization stage synchronizes a harmonic of the common repetition rate.

7. The apparatus of claim 4, wherein the lasers have different repetition rates.

8. The apparatus of claim 7 wherein the first synchronization stage synchronizes lower harmonics of the repetition rates and wherein the second synchronization stage synchronizes higher harmonics of the repetition rates.

9. The apparatus of claim 2, further comprising:

a third synchronization stage for extra-finely synchronizing the two sources, by generating an extra-fine feedback signal comprising the control signal.

10. The apparatus of claim 9, wherein the extra-fine feedback signal is based upon a combination of the laser beams within a nonlinear device.

11. The apparatus of claim 9 wherein the extra-fine feedback signal is based upon a heterodyne beat of the laser beams.

12. A method for synchronizing the repetition rates of two pulse radiation sources in stages, comprising the steps of:

generating a rough feedback signal from an error signal based upon lower harmonics of the repetition rates of the sources;

generating a fine feedback signal from an error signal based upon higher harmonics of the repetition rates of the sources; and generating a control signal based upon the rough feedback signal and the fine feedback signal and controlling the repetition rate and hence the timing of a designated one of the sources with respect to the other source in response to the control signal.

13. The method of claim 12, further including the steps of initially providing the rough feedback signal as the control signal to the designated source, and then gradually shifting to provide the fine feedback signal as the control signal to the designated source.

14. The method of claim 13 wherein the sources have a common repetition rate, wherein the step of generating the rough feedback signal utilizes an error signal based upon the common repetition rate and wherein the the step of generating the fine feedback signal utilizes an error signal based upon a harmonic of the common repetition rate.

15. The method of claim 13, further comprising the step of:

generating an extra-fine feedback signal;

and wherein the step of generating the control signal generates the control signal further based upon the extra-fine feedback signal.

16. The method of claim 15, wherein the extra-fine feedback signal is based upon a combination of the source beams within a nonlinear device.

17. The method of claim 15, wherein the extra-fine feedback signal is based upon a heterodyne beat of the source beams.

18. Apparatus for synchronizing the repetition rates of two pulse radiation sources in stages, comprising:

means for generating a rough feedback signal from an error signal based upon lower harmonics of the repetition rates of the sources;

means for generating a fine feedback signal from an error signal based upon higher harmonics of the repetition rates of the sources;

means for generating a control signal based upon the rough feedback signal and the fine feedback signal; and means for controlling the repetition rate and hence the timing of a designated one of the sources with respect to the other source in response to the control signal.

19. The apparatus of claim 18, further comprising means for initially providing the rough feedback signal as the control signal to the designated source, and then gradually shifting to provide the fine feedback signal as the control signal to the designated source.

20. The apparatus of claim 18 wherein the sources have a common repetition rate, wherein the means for generating the rough feedback signal utilizes an error signal based upon the common repetition rate and wherein the means for generating the fine feedback signal utilizes an error signal based upon a harmonic of the common repetition rate.

21. The apparatus of claim 18, further comprising:

means for generating an extra-fine feedback signal;

and wherein the means for generating the control signal generates the control signal further based upon the extra-fine feedback signal.

22. The apparatus of claim 21, wherein the extra-fine feedback signal is based upon a combination of the source beams within a nonlinear device.

23. The apparatus of claim 21, wherein the extra-fine feedback signal is based upon a heterodyne beat of the source beams.

24. The apparatus of claim 18, further comprising means for adding a dc offset signal to the control signal.

* * * * *

UNITED STATES PATENT AND TRADEMARK OFFICE
CERTIFICATE OF CORRECTION

PATENT NO.        : 6,831,935 B2
APPLICATION NO. : 10/109999
DATED             : December 14, 2004
INVENTOR(S)       : Jun Ye et al.

It is certified that error appears in the above-identified patent and that said Letters Patent is hereby corrected as shown below:

On the title page item (73), should read --The Regents of the University of Colorado, Boulder, CO (US) AND the Secretarty of Commerce for the Government of the United States--.

Signed and Sealed this

Third Day of October, 2006

JON W. DUDAS
*Director of the United States Patent and Trademark Office*